United States Patent
Alvarez

(10) Patent No.: US 9,953,216 B2
(45) Date of Patent: Apr. 24, 2018

(54) SYSTEMS AND METHODS FOR PERFORMING ACTIONS IN RESPONSE TO USER GESTURES IN CAPTURED IMAGES

(71) Applicant: Google Inc., Mountain View, CA (US)

(72) Inventor: Raziel Alvarez, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 14/596,168

(22) Filed: Jan. 13, 2015

(65) Prior Publication Data

US 2016/0203360 A1 Jul. 14, 2016

(51) Int. Cl.
G09G 5/00 (2006.01)
G06K 9/00 (2006.01)
G06F 3/01 (2006.01)
G06K 9/20 (2006.01)

(52) U.S. Cl.
CPC ......... G06K 9/00355 (2013.01); G06F 3/017 (2013.01); G06K 9/2081 (2013.01)

(58) Field of Classification Search
CPC .. G06K 9/2081; G06K 9/00355; G06F 3/017; G10L 15/00; G06T 1/00; G09G 5/00
See application file for complete search history.

(56) References Cited

U.S. PATENT DOCUMENTS

| 7,667,686 B2 | 2/2010 | Suh |
| 8,140,339 B2 | 3/2012 | Hernandez-Rebollar |
| 8,379,134 B2 * | 2/2013 | Foster ................. H04N 5/232 250/330 |
| 8,514,251 B2 | 8/2013 | Hildreth et al. |
| 9,076,033 B1 * | 7/2015 | Barron ............... G06K 9/00355 |
| 2003/0046087 A1 * | 3/2003 | Johnston ............... G06F 3/017 704/275 |
| 2006/0114522 A1 * | 6/2006 | Audenaerde ........... G06F 3/017 358/1.15 |
| 2009/0109795 A1 * | 4/2009 | Marti ..................... G06F 3/011 367/118 |
| 2010/0125816 A1 * | 5/2010 | Bezos ................... G06F 1/1626 715/863 |
| 2012/0128251 A1 * | 5/2012 | Petrou ............... G06F 17/30253 382/182 |

(Continued)

OTHER PUBLICATIONS

S. Agrawal et al., "Using Mobile Phones to Write in Air", *MobiSys'11.*, Jun. 28-Jul. 1, 2011 (14 pages).

*Primary Examiner* — Kent Chang
*Assistant Examiner* — Mark Edwards
(74) *Attorney, Agent, or Firm* — Dority & Manning, P.A.

(57) ABSTRACT

Systems, methods, and computer-readable media are provided for performing actions in response to gestures made by a user in captured images. In accordance with one implementation, a computer-implemented system is provided that includes an image capture device that captures at least one image, a memory device that stores instructions, and at least one processor that executes the instructions stored in the memory device. In some implementations, the processor receives, from the image capture device, at least one image including a gesture made by a user and analyzes the at least one image to identify the gesture made by the user. In some implementations, the processor also determines, based on the identified gesture, one or more actions to perform on the at least one image.

20 Claims, 7 Drawing Sheets

(56) References Cited

U.S. PATENT DOCUMENTS

| | | | |
|---|---|---|---|
| 2013/0044130 A1* | 2/2013 | Geisner | G09G 5/00 345/633 |
| 2014/0141836 A1* | 5/2014 | Rozumyanskiy | G06K 9/228 455/556.1 |
| 2014/0168478 A1* | 6/2014 | Baheti | G06K 9/2081 348/240.99 |
| 2015/0286888 A1* | 10/2015 | Maison | G06F 17/21 382/182 |
| 2016/0034812 A1* | 2/2016 | Gibson | G06N 3/08 706/25 |
| 2017/0060254 A1* | 3/2017 | Molchanov | G06F 3/011 |

* cited by examiner

SYSTEMS AND METHODS FOR PERFORMING ACTIONS IN RESPONSE TO USER GESTURES IN CAPTURED IMAGES

TECHNICAL FIELD

The present disclosure relates generally to computer-implemented user interfaces and augmented vision technology. More particularly, and without limitation, the present disclosure relates to systems, methods, and computer-readable media for performing data entry and other actions in response to gestures made by a user in captured images.

BACKGROUND INFORMATION

Computing devices include graphical user interfaces and input mechanisms to allow the entry and display of data. For example, a desktop PC may include a keyboard and/or mouse to enable a user to enter text and other data. As new device form factors have emerged, manufacturers have focused on replacing traditional input mechanisms to fulfill nominative functions. For example, smartphones and tablets may include touchscreens with virtual keyboards for data entry and display. Voice recognition technology is also being increasingly used to allow hands-free text and other data entry.

New device form factors may prompt different device uses. Further, new device form factors may result in compromised input mechanisms, such as smaller, less responsive keyboards.

SUMMARY

In accordance with embodiments of the present disclosure, computer-implemented systems, methods, and computer-readable media are provided for providing enhanced data collection and performing other actions in response to gestures made by a user in one or more captured images.

In accordance with some embodiments, a computer-implemented system is provided that comprises an image capture device that captures images, a memory device that stores instructions, and at least one processor that executes the instructions stored in the memory device. In some embodiments, the processor receives, from the image capture device, at least one image including a gesture made by a user, analyzes the at least one image to identify the gesture made by the user in the at least one image, and determines, based on the identified gesture, a first action to perform on the at least one image. In some embodiments, the processor also determines a selection area for the gesture, identifies an area of interest in the at least one image based on the determined selection area of the gesture, and performs the first action on the identified area of interest.

In accordance with additional embodiments, a computer readable medium is provided that stores instructions that are configured to cause at least one processor to perform operations. In some embodiments, the operations performed by the processor include receiving at least one image including a gesture made by a user, analyzing the at least one image to identify the gesture made by the user in the at least one image, and determining, based on the gesture, a first action to perform on the at least one image. In some embodiments, the operations performed by the processor further include determining a selection area for the gesture, identifying an area of interest in the at least one image based on the determined selection area of the gesture, and performing the first action on the identified area of interest.

In accordance with still further embodiments, a method is provided that comprises operations performed by one or more processors. In some embodiments, the operations performed by the processor(s) include receiving at least one image including a gesture made by a user, analyzing the at least one image to identify the gesture made by the user in the at least one image, and determining, based on the gesture, a first action to perform on the at least one image. In some embodiments, the operations performed by the processor(s) further include determining a selection area for the gesture, identifying an area of interest in the at least one image based on the determined selection area of the gesture, and performing the first action on the identified area of interest.

Additional embodiments and related features of the present disclosure are described herein.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments.

DETAILED DESCRIPTION OF EXEMPLARY EMBODIMENTS

Figure 1A:
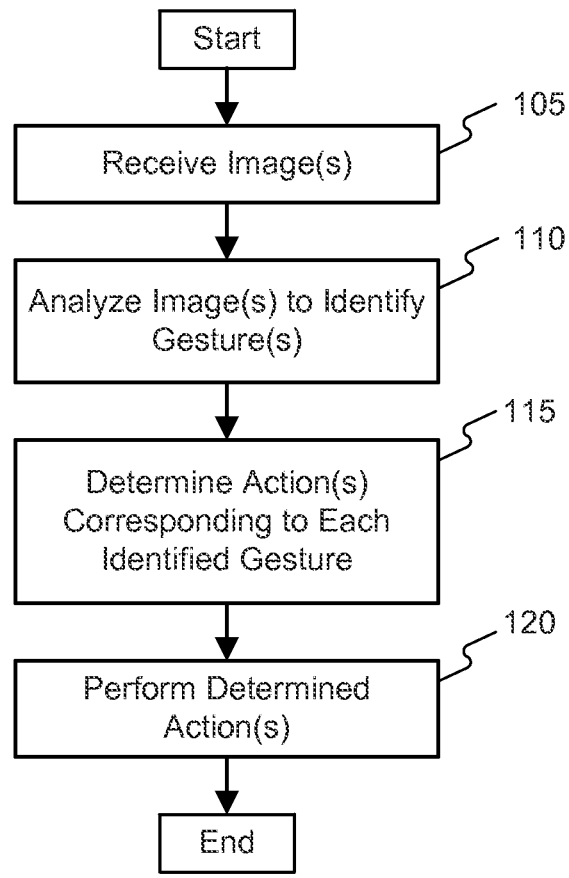
FIG. 1A illustrates a flowchart of an example gesture user interface process, consistent with embodiments of the present disclosure.

Embodiments of the present disclosure will now be described. Example embodiments are described with reference to FIGS. 1-6, which may be implemented together or individually.

The present disclosure describes computer-implemented systems and methods for identifying gesture(s) made by a user in one or more captured images for the purposes of performing action(s), such as text, image, and/or other data input. According to certain embodiments, images may be captured by a computing device (e.g., a computer, a laptop, a tablet, a smartphone, a wearable computing device, etc.) that includes a camera, a display, at least one processor, and a memory device. The captured image(s) may include one or more gestures made by a user (e.g., a symbol, a sign, or a motion created with one or both hands of the user). By way of example, a user's smartphone may capture an image of a user making an "O" ring or "L" shape using their index and thumb in the foreground. The processor of the user's smartphone may analyze the captured image to identify the gesture and then perform one or more actions based on the identified gesture.

In some embodiments, the gesture may identify an action for the processor to perform with respect to an area of interest in the image. For example, a user may make an "O" shape with their hand in the foreground of an image, outlining the face of a person in the image. The processor may analyze the image to identify the "O" gesture and determine action(s) corresponding to the "O" gesture, such as performing facial recognition. The processor may further determine that the "O" gesture identifies an area of interest in the image, such as a circle inscribed in the circular "O" shape. The processor may then select the area of interest identified by the gesture and perform facial recognition on the area of interest. In some embodiments, the processor may perform other actions with respect to an area of interest, such as optical character recognition (OCR) or image analysis for other forms of object recognition.

In some embodiments, the action may be based on a gesture and a classification of an area of interest in the image identified by the gesture. For example, the gesture may be a user's index finger pointing to contact information (e.g., a phone number, fax number, email etc.) on a printed document (e.g., a business card, a magazine ad, a billboard, etc.). The processor may identify the contact information (e.g., using optical character recognition) and determine the contact information type (e.g., using optical character and/or context recognition). The processor may then determine an action based on the contact information type. For example, the processor may initiate communication based on the contact information and the contact information type (e.g., a new email to an email address, a telephone call to a phone number, a text message to a cell phone number, etc.).

In still further embodiments, the processor may identify a gesture in a video captured by a camera or other device. The captured video may include one or more frames or images. By way of example, a user may circle an object in the captured video with their index finger. The processor may analyze the captured video to identify an area of interest in one or more frames of the video based on the motion gesture.

Consistent with the present disclosure, a gesture may be any sign, symbol, or movement made by a user. A gesture may indicate a letter, word, meaning, or idea. For example, a gesture may correspond to a sign in a sign language or a recognized hand symbol, such as a like or peace sign. A gesture may also correspond to a recognized movement, such as the waving of a hand or a head nod. In addition, a gesture may reference or highlight an object in a scene of a captured image or video. For example, a user may point to or outline with their hand a road sign, menu card, or other object in a captured image. In addition, as further described below, gestures may be used to capture and enter text or other information in an image.

Gestures may be formed or made by a user using any combination of the user's fingers, hands, arms, etc. For example, a hand may wave or a finger may outline a circle shape in a round motion. As another example, two hands may be coordinated to perform a single gesture. In addition, as a still further example, a user's palms may be held parallel, facing each other, to indicate a short distance (e.g., two objects are close together) or designate an area of interest. Other gestures may also be defined and used, in accordance with the present disclosure.

In an example embodiment, a gesture may indicate a direction. For example, a gesture may point in a relative direction or angle. In some embodiments, a gesture may include a user's finger that points left, right, up, or down. A gesture may also indicate a region in a scene or identify a particular object. For example, a user may circle their fingers to form an "O" shape around a car or house. In another example, a user may underline a book title or other text with their finger.

Figure 5:
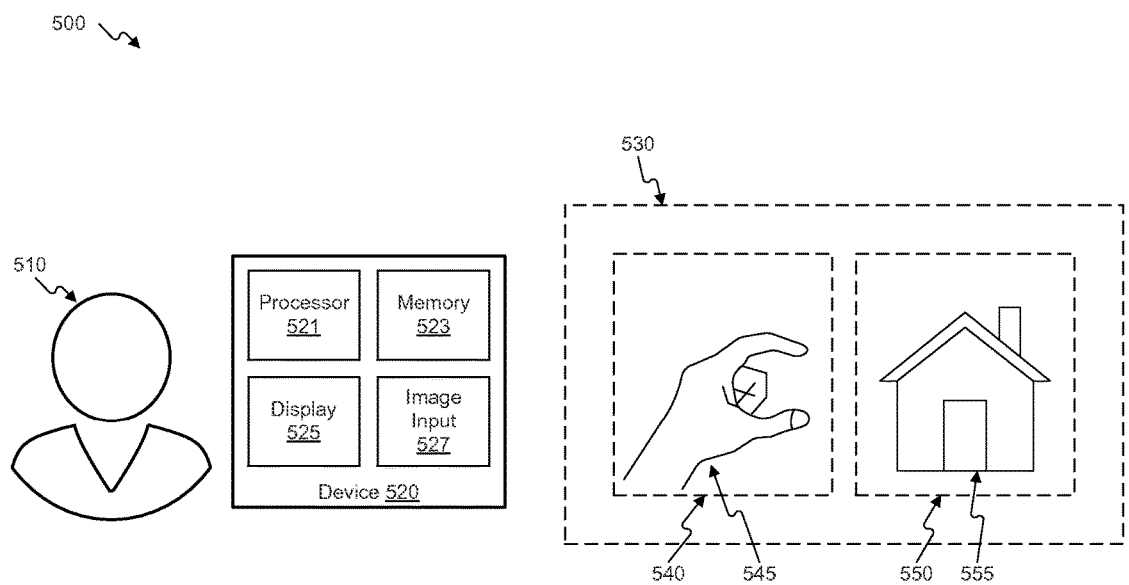
FIG. 5 illustrates an example implementation and arrangement of components, consistent with embodiments of the present disclosure.
Figure 6:
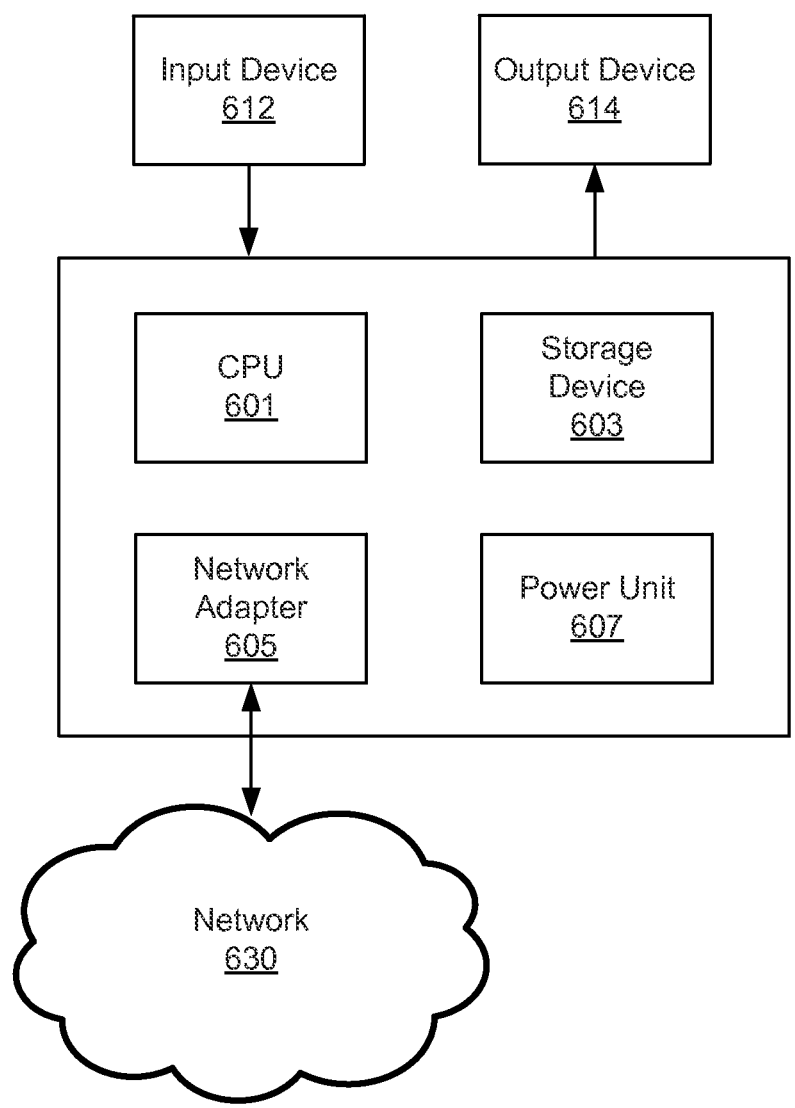
FIG. 6 illustrates an example system for implementing embodiments of the present disclosure.

Consistent with the present disclosure, a computing device may be used to capture a gesture as part of an image or video (see, e.g., FIGS. 5 and 6). In some embodiments, the device may include a camera which captures an image or video of a gesture made by a user. Further, the device may include a display to render or present the image or video containing the gesture to a user. In some embodiments, the image or video may be displayed or rendered to a user in real-time or upon request as playback from a memory device. For example, a smartphone may show what the camera is capturing on a display screen. The user may hold the smartphone with one hand while performing a gesture in the foreground of the camera with their other hand. The display may allow the user to see how their gesture is being captured relative to other objects in a background or scene. The user may indicate a particular area of interest that is being captured by perform the gesture in a particular location and/or direction. In another example, a head-mounted or other wearable form of a computing device may include a user point-of-view camera and a display to provide an augmented reality illustration to the user. For example, a head-mounted computing device may function in a similar fashion to a smartphone in capturing and displaying images containing gestures created by the user. However, wearable computing devices may make it be easier to make a wider range of gestures, including two-handed gestures.

FIG. 1A illustrates a flowchart of an example gesture user interface process 100A, consistent with embodiments of the present disclosure. As described below, example process 100A may be implemented with one or more components, such as those illustrated in FIGS. 5 and 6. As will be appreciated from this disclosure, other arrangements and implementations are possible. Additionally, the process steps or operations of FIG. 1A may be performed using one or more processors, storage mediums, image capture devices, and displays. It should be understood that the steps of process 100A may be performed in any order to achieve the objects of the disclosure. Accordingly, the depicted order of FIG. 1A is merely an example and provided for purposes of illustration.

In step 105, the processor may receive image(s) as input from an image capture device, such as a digital camera. In some embodiments, the camera may capture and transmit digital image(s) to the processor. For example, the camera may take an image or snapshot in response to a signal received by the user. The user may, for example, press a button on the device to take a picture. Other forms of signaling mechanisms or methods may be used, such as voice commands (e.g., captured by a microphone) and alarms or triggers based on motion detection (e.g., using an accelerometer or image analysis).

In some embodiments, the image capture device captures and transmits multiple images or a video to the processor. For example, a camera may forward a video stream in real-time as it is captured. A real-time video stream may be constantly or periodically received as a background process. In another example, the camera may capture and transmit multiple images or a video stream to the processor in response to a signal, alarm, or trigger, such as those described above.

In some embodiments, the image capture device may periodically capture and transmit images at a fixed or scheduled rate. For example, the processor may signal to the camera to capture an image every five seconds or every minute. The frequency at which the image sampling occurs may increase or decrease based on a signal, alarm, or trigger, such as those described above. For example, a processor may initially not receive any images when the device is not in use. When the user picks-up or handles the device, sensors (e.g., an accelerometer or ambient light sensor) may detect the activity. The processor may then send an instruction to transmit images every ten seconds based on the detected motion of the device. Based on a perceived increase or decrease in device activity (e.g., using sensors such as an accelerometer or ambient light sensor), the processor may send an instruction to correspondingly increase or decrease the image capture and transmission rate, respectively. In another embodiment, the user may provide input via a button on the device to provide an increase in the image sampling rate. The increased rate may continue indefinitely (e.g., until the user provides additional input) or only for a fixed period of time (e.g., two or five minutes). The above-noted image sample rate control mechanisms may be used in combination. For example, the device may perform an automatic rate adjustment based on perceived device activity, while allowing the user to override the automatic rate with an increased rate.

Referring again to FIG. 1A, in step 110, the processor may analyze the captured image(s) or video to identify gestures made by a user in the received image(s) or video. In an embodiment, gesture identification may include the processor performing object recognition and detecting the presence of a gesture made by a user. The processor may detect gestures using conventional image analysis techniques, motion data, and/or depth of field measurements. For example, the processor may use image analysis techniques to detect, as a recognizable object, the hand(s) of a user in a scene of a captured image. Image analysis techniques may also include matching the shape and/or position of the hand(s) of the user to stored gestures that are recognized by the device.

When the gesture is a motion-based gesture, the processor may utilize image analysis techniques and motion data (e.g., speed, direction, center of gravity) to track and identify the moving gesture. For example, the processor may perform image processing techniques to recognize the moving gesture of a user's hand or finger against a background. In a series of images, the processor may calculate the changes in the position of the user's hand or finger, as a recognized object, from one image to the next. When the processor determines, using image analysis techniques and motion data, that the movement of a user's hand or finger correspond to that of a stored motion gesture, the processor may determine that the motion gesture is present.

Because a user gesture may likely found in the foreground of an image, the processor may utilize depth of field measurements to detect the presence of a foreground gesture. For example, in some embodiments, the processor may receive stereoscopic data based on images from a plurality of cameras. The processor may then utilize the stereoscopic images to calculate near-field objects in the image or video. In some embodiments, the mere presence of a near-field object may be used to determine the presence of a gesture. In another example, the processor may receive depth data from depth sensors, such as infrared or ultrasound sensors. The sensor(s) may generate a map indicating the distance from the camera to various objects in the image. When there are points in a particular plane of depth that form a hand-shape, the processor may determine that a gesture is present in the image.

Once the processor determines a gesture is present in the captured image or video, the processor may recognize which gesture is present. In some embodiments, the processor may execute object recognition algorithms on received images to determine which gesture is shown in an image. Object detection procedures may include pose clustering, geometric hashing, Haar-like features, and/or speeded up robust features (SURF), for example.

In an embodiment, the processor may utilize data from or related to a Deep Neural Networks (DNN) to recognize gestures. A feedforward DNN, for instance, may be trained with a variety of input images showing a particular gesture in different positions, sizes, and viewing angles. The training may include the image capture device capturing various images of sample instances of a particular gesture.

Images containing gestures may be preprocessed by the processor, for example, using an edge detection filter. The processor may utilize a network connection to transmit the images to a feedforward DNN. In other embodiments, the DNN may be hosted in the device, utilizing the processor. The DNN may label the preprocessed images.

In an embodiment, the processor may label the images using a simple Boolean label. Using the Boolean label the DNN may indicate whether the gesture is present in the images or not. The DNN may utilize negative image examples (e.g., images not containing a gesture), that may be provided during training, to determine that a gesture is not present.

In an embodiment, the processor may label the images based on a mapping of specific regions of the image. The labels may include a value indicating a normalized measure of the ratio from the center of the gesture. For example, the center may have a value of "1," while the farthest region that contains the gesture may have a value of "0.5." In this example, all other regions could have a value of "0." The normalization values may be invariant to size. At runtime, the DNN trained to map specific regions may produce output indicating the regions in the image that contain the gesture. For example, the DNN may identify regions having a value greater than a predefined threshold (e.g., "0.5"). The DNN may analyze the identified regions as a cluster to verify that the regions form a cluster that represents a desired shape corresponding to a gesture. The processor may analyze the values of the normalized measure of the ratio obtained from the DNN to determine the shape of the gesture expressed in the image. The values may be combined to form a score. For example, the processor may calculate a score for an image using a weighted average of the values of each region.

The DNNs may also bet trained to learn the movement of motion gestures. When the gesture is a motion gesture, different DNNs could be utilized to identify stages of the motion gesture, identifying values (e.g., the normalized measure of the ratio from the center of the gesture for each region) for each frame of a dynamic motion gesture. The processor may calculate a score for each frame of the motion gesture based on the values. The processor may calculate a motion score based on each of the frame scores. For example, the processor may average the frame scores over time. The processor may give more weight to frames indicating increased motion.

In other embodiments, the processor may utilize Long Short Term Memory (LSTM) neural networks. LSTM neural networks may be trained to provide an output given a term-series of inputs. For example, LSTM neural networks may receive image frames of a motion gesture over a period of time.

In some embodiments, the processor identifies an identification code or designation for the gesture. For example, the results from the object recognition algorithms (e.g., the image score, the frame scores, or the motion score) may be used to generate a gesture identifier associated with the gesture in the captured image(s) or video. In some embodiments a DNN or LSTM neural network may provide an identifier of the gesture in the image(s). In other embodiments, a lookup table may be used to map the object recognition algorithm result to a gesture code. The gesture code may be an alphanumeric code, such as "R10." In some embodiments, the gesture code may have or provide further information. For example, the code may specify the hand, finger, or other limb used in the gesture, the gesture shape or form, and/or coordinates of the gesture in the image or video.

By way of example, the gesture code may be "RHSL110321154265," where "RH" indicates that the gesture is made with the right hand, "S" represents that the gesture is a static gesture (as opposed to moving gesture), "L" indicates an L-shape of the gesture; "110321" represents the x- and y-coordinates of the index fingertip (e.g., (110, 321)); and "154265" represents the x- and y-coordinates of the thumb tip (e.g., (154, 265)). As a further example, the gesture code may be "LHSO214245026," where "LH" indicates that a left hand is used to make the gesture; "S" represents a static gesture; "O" designates an O-shaped gesture; "214245" indicates x- and y-coordinates of the center of the circle formed by the O-shaped gesture (e.g., (214, 245)); and "026" represents the length of the radius of the circle formed by the O-shaped gesture (e.g., in pixels, millimeters, or another unit of length). In a still further example, the gesture code may be "RHMLI123096245100," where "RH" indicates the gesture is made with the right hand; "M" designates a motion gesture; "IL" represents that the gesture is a line made using the index finger; and "123096245100" represents the x- and y-coordinates of the start and end points of the line (e.g., (123, 096); (245, 100)). Certain fields or portions of the gesture codes may be left out. Further, the above example gesture codes may be reordered or modified. In addition, other example gesture codes may be implemented, consistent with the present disclosure.

In step 115 of FIG. 1A, the processor may determine the action(s) corresponding to the gesture. In an embodiment, the processor uses the gesture identifier to determine the action(s) corresponding to the identified gesture. For example, the processor may use the gesture identifier to query a lookup table of gesture identifiers and corresponding action(s). When the gesture identifier is a gesture code such as that previously described, the processor may use a portion of the gesture code to determine the action(s). For example, from the gesture code "LHS0214245026," the processor may query the lookup table using "0". In certain embodiments, a gesture made with a user's left hand may correspond to different action than the same gesture made with the user's right hand. In such instances, the gesture-action lookup table may need the gesture and the hand(s) used to make (e.g., "LHSO") the gesture to identify the corresponding action(s) to be performed.

In some embodiments, the processor may determine that there are multiple actions corresponding to the gesture. For example, the actions may include starting a stopwatch and resetting a step count for a pedometer application. Other combinations of actions may exist, including those described herein.

In step 120, the processor causes the determined action(s) to be performed. The action(s) may be performed individually by the processor or the processor may provide appropriate instructions or signaling to cause the actions(s) to be performed by other processors or system components. In some embodiments, the action(s) may or may not include action(s) to be performed on the captured image or video or using the captured image or video. In cases where the action(s) are to be performed on the captured image or video, image processing may be performed by the processor. Image processing may include, for example, optical character recognition (OCR), reverse image searching, cropping, and/or saving the image in which the gesture appears. In some embodiments, certain actions may require image processing functions. For example, the gesture may require the processor to perform optical character recognition on an area of interest in the image in which the gesture appears. Furthermore, certain action(s) may require the use of an image, but further processing of the image itself may not be necessary. For example, the processor may attach the image to an email or text message.

In some embodiments, the processor may perform action(s) without further image analysis or processing. The gesture may prompt the processor to power off the device, start a timer, set an alarm, or call a certain contact from an address book. For example, the camera may capture a gesture of a user tapping their wrist. The processor may then start a stopwatch. In another example, a user may use metered street parking. Responsive to making a "P" sign with one hand, the processor may save the current location and start a timer, allowing the user to recall the location of the car and determine when the parking meter expires. These actions may be flagged in the look-up table, allowing the processor to determine that a "no image processing" flag is present for the action.

The action(s) may be fully automated or may require further user input. In certain embodiments, the action may be performed automatically, where a task may be completed without user intervention. For example, the processor may save the image to a default folder. In another example, the processor may start a timer having a predetermined amount of time or provide a map of the user's current location.

In certain embodiments, the action may require further user commands. For example, the action may provide the user with a menu. In another example, the user may have to confirm a selection, chose from a finite number of options provided by the processor, or provide further input. The user may provide further user commands using additional gesture(s), audible commands, tactile input (e.g., pressing a button), and/or input via another input device. The action may initiate a task that the user may then complete. For example, the processor may open a draft email for the user to complete and send.

Once the action(s) are performed, process 100A ends. In certain embodiments, the action(s) may include subsequent processing or further image analysis. For example, subsequent action(s) may be determined, identified, and performed after the completion of initial actions. Subsequent actions may be contingent upon the results of the initial actions.

Figure 1B:
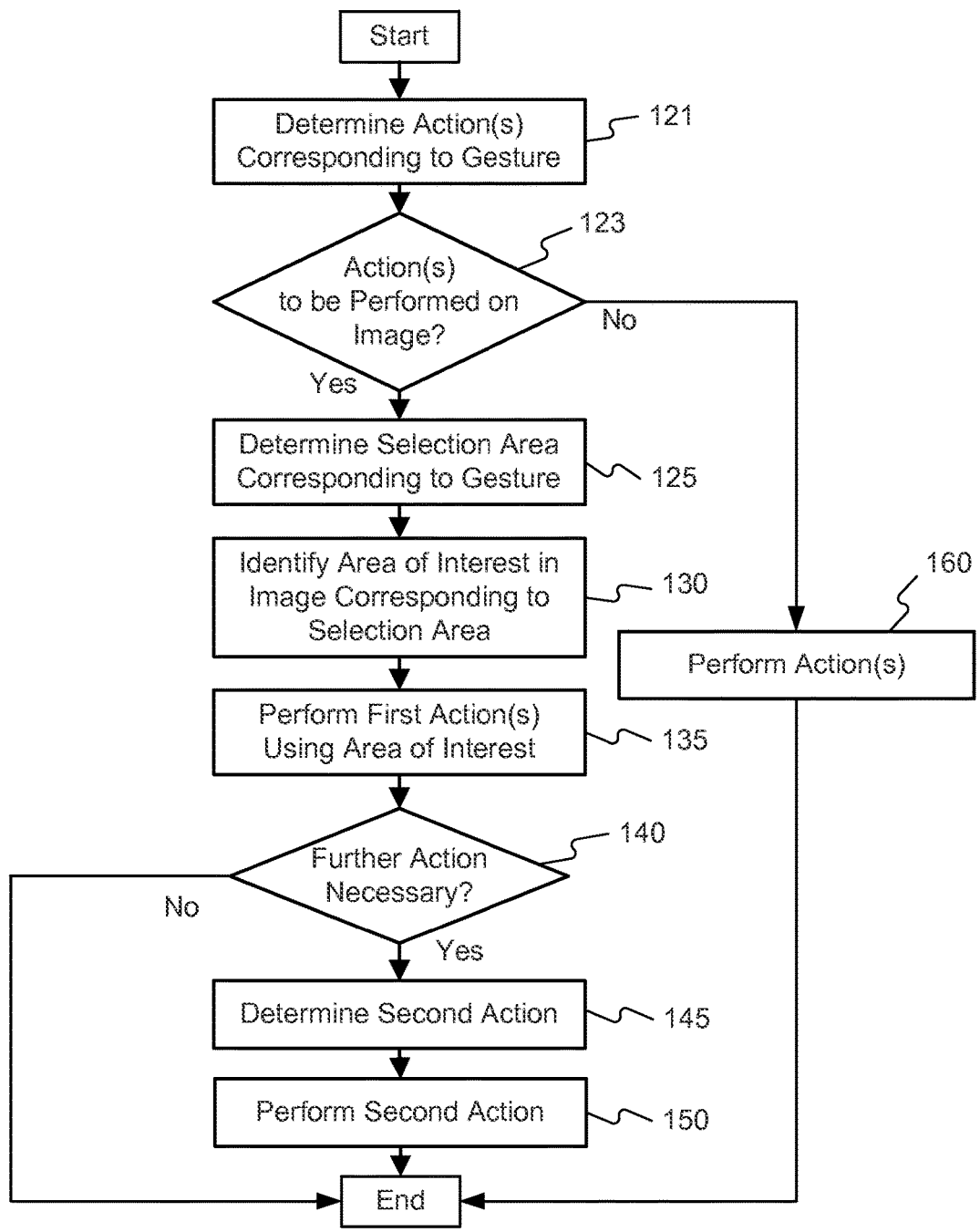
FIG. 1B illustrates a flowchart of another example gesture user interface process, consistent with embodiments of the present disclosure.

FIG. 1B illustrates a flowchart of an example gesture user interface process 100B, consistent with embodiments of the present disclosure. As described below, example process 100B may be implemented with one or more components, such as those illustrated in FIGS. 5 and 6. As will be appreciated from this disclosure, other arrangements and implementations are possible. Additionally, the process steps or operations of FIG. 1B may be performed using one or more processors, storage mediums, image capture devices, and displays. It should be understood that the steps of process 100B may be performed in any order to achieve the objects of the disclosure. Accordingly, the depicted order of FIG. 1B is merely an example and provided for purposes of illustration. Process 100B may illustrate example embodiments for implementing steps 115 and 120 of FIG. 1A.

In step 121, the processor may determine action(s) corresponding to the gesture. In some embodiments, the processor references a lookup table by using a gesture identifier as a key.

In step 123, the processor determines whether the action(s) are to be performed on the captured image(s) or video. As discussed previously, certain actions may require use of the image or image processing. For example, the processor may perform optical character recognition algorithms using the image. Other actions may not make additional use of the image. For example, the action may be the placing the device in sleep mode or setting an alarm.

In step 160, the processor performs the actions that have been determined to require no further image processing (e.g., step 123, "No"). As discussed above, the processor may perform actions that do not require image processing. At step 160, the processor may discard the image or video in which the gesture appears. This may reduce the memory required for process 100B.

Figure 2C:
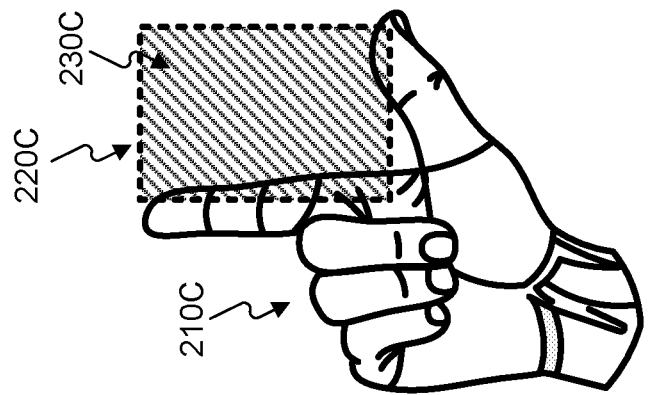
FIG. 2C illustrates a diagram of a still further example gesture, consistent with embodiments of the present disclosure.
Figure 2B:
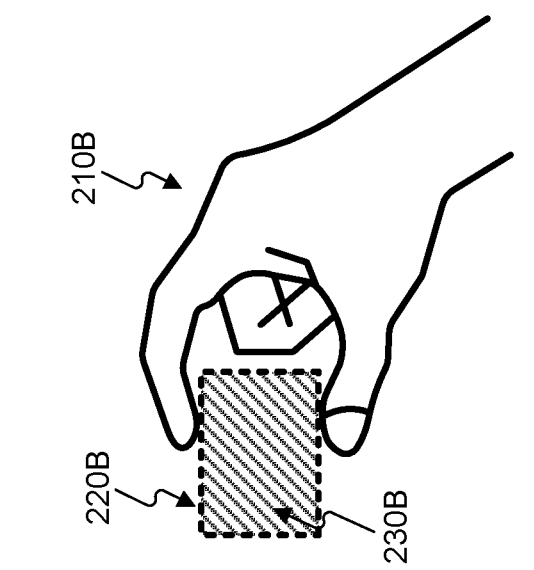
FIG. 2B illustrates a diagram of another example gesture, consistent with embodiments of the present disclosure.
Figure 2A:
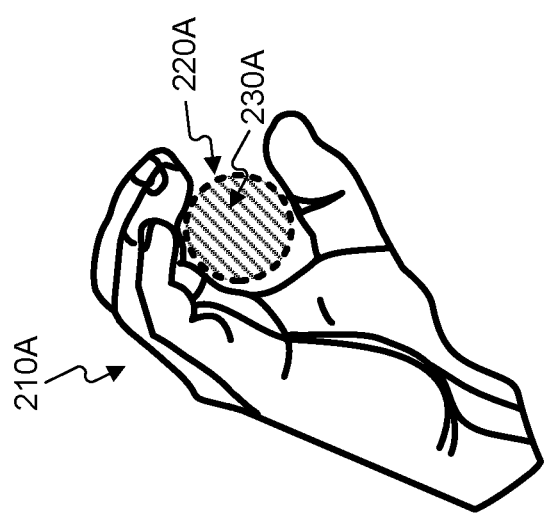
FIG. 2A illustrates a diagram of an example gesture, consistent with embodiments of the present disclosure.

In step 125, responsive to determining the action(s) are to be performed on the image or require further image processing (e.g., step 123, "Yes"), the processor may determine the section area corresponding to the gesture. In some embodiments, the gesture made by the user may identify an action as well as a selection area. The selection area may be a geometric region in the image or video that is identified by the gesture. In certain embodiments, the gesture may define coordinates or boundaries of the selection area. For example, the processor may translate the values of the boundaries of a specific image into "real world" coordinates. The processor may determine a kinematic model for the image input device that captured the image. For instance, the processor may estimate the kinematic model using the average height of a human being, as well as input from sensors on the device, such as accelerometers and gyroscopes. The processor may also use stereoscopic images to calculate the depth of image coordinates. For motion gestures, the processor may utilize the "real world" coordinates to stitch together images. For example, the processor may use traditional map projection techniques, such as rectilinear projection. FIGS. 2A-2C illustrate example gestures that define corresponding selection areas.

FIG. 2A illustrates example "O" gesture 210A. Gesture 210A may have selection area 220A defined by cupped fingers, which may, in turn, identify area of interest 230A in an image. Gesture 210A may have a circular-shaped area of interest. For example, the processor may calculate the center and radius of a circle inscribed in the "O" gesture as selection area 220A. Gesture 210A may be useful for identifying objects or to hone in on specific objects in an otherwise busy scene or setting.

FIG. 2B illustrates example "C" gesture 210B. Gesture 210B may have selection area 220B defined by the index finger and thumb of a user. For example, the index finger and thumb may indicate the top and bottom sides of a rectangle. As pictured, the processor uses the user's hand to define the right side of selection area 220B. The left side of square that makes selection area 220B may equidistant from the tip of the index finger as the right side. In another embodiment, gesture 210B is a motion gesture, where the right side is defined by the start point of the gesture as the hand is moved from left to right across the frame of the video or series of images. The same functionality may apply to a motion gesture moving from the right to the left. Selection area 220B may identify area of interest 230B in the image in which the gesture appears. Gesture 210B may be useful to identify a line of text or a sign as area of interest 230B.

FIG. 2C illustrates example "L" gesture 210C. Gesture 210C may have selection area 220C defined the index finger and thumb of a user held at 90 degrees. For example, gesture 210C may have section area 220C corresponding to the rectangle formed using the tips of the index finger and thumb as opposite corners. The processor may determine right angles based on the frame of the image or the direction of gravity (e.g., using an accelerometer). In another embodiment, selection area 220C is a parallelogram, where the processor identifies the angle between the thumb and index finger of the gesture in the image. Gesture 210C may be useful to identify an article, document, or print as area of interest 230C.

Other gestures may define boundaries of selection areas having other shapes. Other arrangements may exist for defining a selection area. In some embodiments, the selection area of a gesture may be made relative to the frame of the image, rather than the position of the gesture. For example, the processor may always identify the top left corner of the image as the selection area for a particular gesture, regardless of the positioning of the gesture. In some embodiments, the selection area for a gesture may be the entire frame of the image or video in which the gesture appears. For example, the processor may determine that the action corresponding to the gesture is to save the entire image in which the gesture appears. Other selection area techniques may be used commensurate with the objects of this disclosure.

In step 130, the processor may identify an area of interest in the image or video corresponding to the selection area determined in step 125. The processor may use the boundaries of the selection area to identify a region of the image in which the gesture occurs. In certain embodiments, the processor may isolate a portion of the image or video. For example, the processor may crop the portion of the image corresponding to the selection area. The processor may save this portion of the image as the area of interest and discard the rest of the image. This process may reduce the memory necessary to save the image data. Further, subsequent operations may utilize the area or interest rather than the entire frame. Because the operations would be performed on a smaller region, processing may be performed more efficiently, potentially reducing power consumption and increasing the speed of the operations.

Because the gesture may overlap the area of interest, the processor may utilize a second image to identify an area of interest. In some embodiments, multiple images may be taken before, after, and/or during the appearance of the gesture. The set of images are used to identify the area of interest in the scene depicted with the gesture itself not present. For example, the camera may capture a set of images using a burst capture mode. If the camera is not subject to significant motion, the processor can apply the selection area of the gesture to an image in the burst set taken just after the gesture leaves the frame of the camera. This may allow the area of interest to not include any interference from the gesture being in the image.

In step 135, the processor performs first action(s) (from the set of determined action(s)) on the area of interest. In some embodiments, the processor may perform a calculation using the area of interest and produce a result. For example, the first action may be to perform an optical character recognition (OCR) on the area of interest, which may produce text output. In an embodiment, the first action may utilize network resources to perform the first action. For example, the first action may include a reverse image search on the area of interest. To complete the search, the processor may submit the area of interest to various search engines using a wide area network (WAN), such as the Internet. Similarly, other processes that could be performed locally may be sent to a server for processing. For example, a networked server may perform optical character recognition calculations rather than the device which capture the image. By using network resources, rather than the processor of the computing device, faster results may be procured using less power.

In an embodiment, the first action may not produce a result. For example, the first action may be to save the area of interest to memory or networked storage. In other examples, the first action may cause the processor to automatically upload the area of interest to a social media website or email the area of interest as an attachment to a colleague.

In step 140, the processor determines whether additional action(s) are necessary. In certain embodiments, the processor may identify a second action or set of additional actions based on the gesture and/or the result of the first action(s). Table 1 below provides a list of exemplary gesture identifiers with corresponding actions. As indicated in the table, first action(s) may be determined from the gesture. Certain gestures may or may not also have second or further actions. In addition, there may be cases where there are no further action(s) after completing the first and second action(s). In such instances, process 100B may end.

In some embodiments, the first action may be to classify the area of interest. For example, the processor may determine whether the area of interest corresponds to text, a face, an object, or a landscape. The processor may perform OCR on the area of interest. When the area of interest produces coherent results, the processor may classify the area of interest as text. When the OCR operation does not produce results or results in an error, the processor may perform facial recognition algorithms to determine whether the area of interest corresponds to a face. If the area of interest is not text or a face, the processor may perform a reverse image search. The results from the reverse image search may indicate whether the image is a particular object or a view of a particular location. Rather than iterating through different calculations to eliminate individual classifications, the processor may perform a single image analysis algorithm. The result of the algorithm will correlate with one of the available classifications.

In some embodiments, the first actions may include performing OCR on an image and classifying the resulting text. The OCR results may be classified using regular expressions or format filters. When the text validates as meeting the format for an email, it may be classified as such. Similarly, when the text meets the format for a street address, the processor may determine that the text should be classified as an address.

In step 145, the processor may determine the second action(s), responsive to determining that second action(s) are necessary (e.g., step 140, "Yes"). The processor may identify the second and any subsequent actions based on the results of the first actions and the gesture. A list of example second actions is provided in Table 1. As shown in the table, the first action may inform the second action. When the first action results in a classification, potential second actions may all be directed to the same idea, but the classification will inform the specific execution necessary. For example, the first action may be to perform OCR and classify the OCR results to determine the type of contact information in the area of interest, such as an email, phone number, or street address. While the gesture may be generally directed to initiating communication, the classification may ensure that the communication is initiated properly. For example, the processor may utilize the classification information to initi-

TABLE 1

| Gesture | First Action(s) | First Result | Second Action(s) |
|---|---|---|---|
| A | Start a timer | N/A | N/A |
| B | Save image once gesture is removed from image | N/A | N/A |
| C | Save area of interest as an image | N/A | N/A |
| D | Perform OCR on area of interest | Text in image | Copy text to clipboard |
| E | Classify area of interest | "Text" "Face" "Object" "Landscape" | Submit search query of text Perform facial recognition Identify object Determine location |
| F | Perform OCR on area of interest; classify resulting text | "Email address" "Phone number" "Street address" "Social networking username" | Begin draft email Initiate call Open in Maps application Begin draft message on social networking platform |
| G | Validate UPC code | Item corresponding to UPC code | Determine location to identify current retailer; determine competitors price; inform user whether current retailer offers best price. | ate a telephone call to a phone number, draft an email to an email address, store and map a street address, or use the proper social networking application to author communication to a particular social networking username or identifier.

In step 150, the processor performs the second action(s). In an embodiment, the processor carries out the procedures determined in step 145. For example, the processor may open a new draft email to an email address that is identified using OCR and classification processes.

In some embodiments, the process of FIG. 1B may continue to determine third action(s). For example, the processor may determine additional actions based on, for example, the gesture, the results of the first action, and/or the results of the second action. The processor may be determine and perform subsequent actions in a similar manner as discussed with regard to the second action(s) (e.g., steps 145 and 150).

Figure 3:
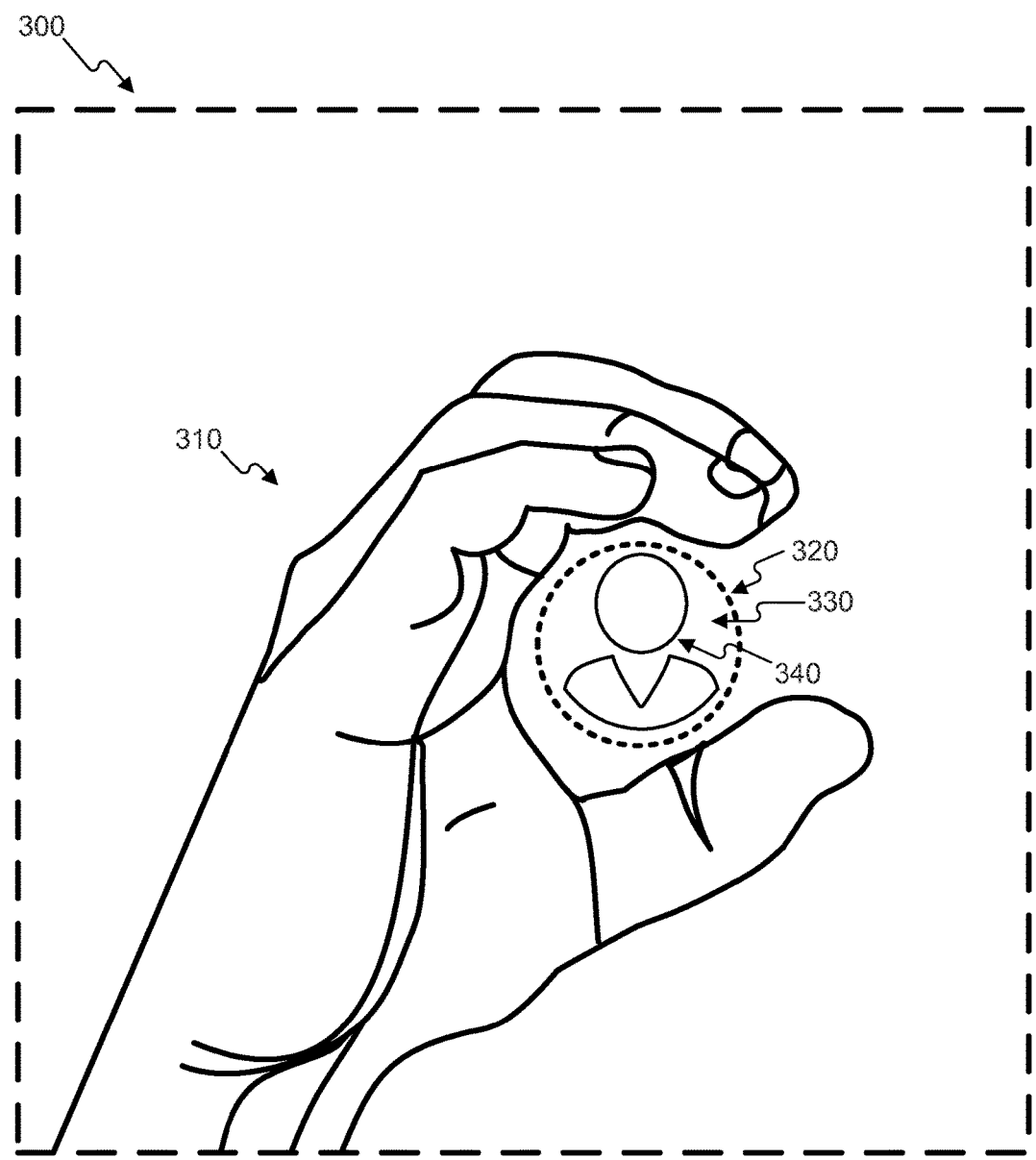
FIG. 3 illustrates a diagram of an example augmented vision user interface, consistent with embodiments of the present disclosure.

FIG. 3 illustrates an example augmented vision user interface which may be used in connection with the example embodiments of FIGS. 1A and 1B. For example, image 300 may be provided to the processor (step 105). The processor may analyze image 300 to determine that gesture 310 is present and identify gesture 310 (step 110). For example, the processor may determine that gesture 310 is an O-shaped gesture, identified by gesture code "LHSO" (e.g., left hand, static O-shape). The processor may determine that the O-shape corresponds to an action of classifying the area of interest and an action of performing facial recognition on the area of interest (step 115). The processor may then perform the action(s) corresponding to the gesture 310 (step 120).

Other steps or operations may be performed by the processor in connection with the example embodiment of FIG. 3. For example, the processor may query a lookup table using the "LHSO" gesture code. The processor may then identify that the classification action requires image processing (step 123, "Yes"). The processor may then determine selection area 320 for the gesture "LHSO" (step 125). For example, the processor may inscribe a circle in the ring formed by the thumb and fingers, as depicted in FIG. 3. The processor may then determine that area of interest 330 corresponds to selection area 320 (step 130). For example, the processor may crop image 300 to include only face 340. Processor may then perform the classification procedure on area of interest 330 (step 135). Because area of interest 330 includes face 340, the processor may classify area of interest as including a face. The processor may then identify further action (step 140, "Yes") and determine a second action corresponding to gesture "LHSO" for a "face" area of interest (step 145). Using a lookup table, for example, the processor may determine that the second action is to search through user photos to determine if the user knows the person depicted. The processor may perform facial recognition algorithms or reverse image searches to identify and provide to the user any contacts of the user that may correspond to face 340 (step 150).

Figure 4:
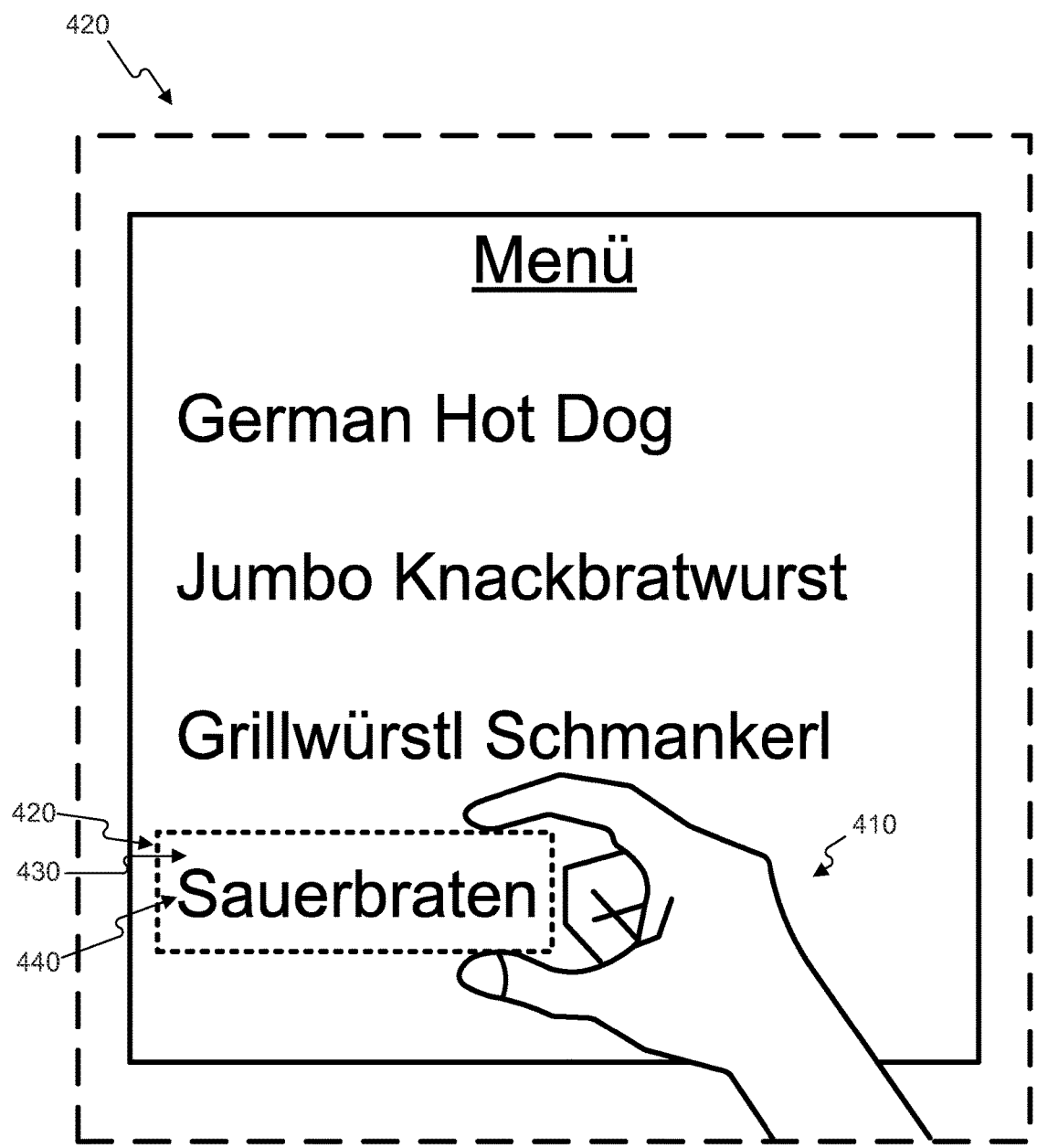
FIG. 4 illustrates a diagram of another example augmented vision user interface, consistent with embodiments of the present disclosure.

FIG. 4 illustrates an example augmented vision user interface. FIG. 4 may also be used in connection with the example embodiments of FIGS. 1A and 1B. In this example, the user may be reading text in a foreign language, such as the menu depicted in image 400. Image 400 may be provided to the processor along with video or additional images of the gesture (step 105). The processor may determine that gesture 410 is present and identify gesture 410 (step 110). For example, the processor may determine that gesture 410 is a C-shaped gesture, identified by gesture code "RHMC" (e.g. right hand, moving O-shape). The processor may then determine, by querying a database with the gesture code, that the action(s) to be performed include performing an OCR and determining the language of the resulting text (step 115). The processor may then perform the action(s) corresponding to the gesture 410 (step 120).

Other steps or operations may be performed by the processor in connection with the example embodiment of FIG. 4. For example, if the action requires image processing (step 123, "Yes"), the processor may determine the selection area of gesture 410. In this example, gesture 410 may be a moving gesture, where the right hand of the user moves over text 440 using the C-shape. The processor may retrieve additional video or images depicting the gesture if necessary. The processor may determine the start and end coordinates of the gesture and may use the location of the thumb and index finger to derive the top and bottom border of selection area 420 (step 125). Once the outline of selection area 420 is determined, the processor may select area of interest 430 (step 130) to perform OCR and determine the language of the resulting text (step 135). The language may be classified using natural language processing, Internet searching, or specific language algorithms. The processor may determine to perform a machine translation using the language resulting from the first action(s) (step 140, "Yes;" step 145). The processor may then perform the German-to-English machine translation text 440 (step 150). For example, the processor may send the text to server via the Internet for processing. The English translation may be shown on a display of the computing device for the user or pronounced using audio output.

As noted above, examples of actions are illustrated in Table 1. Further, the user may define additional gesture-action pairs. For example, a processor may receive input from a user to store additional sets of actions and logic corresponding to gestures and conditional results based on the first and/or second action(s). By way of example, the processor may receive additional tables, similar to Table 1, that define additional actions for a particular gesture identifier, such as third and fourth action(s). Additional actions may involve loops with feedback and/or actions that are to be performed on a continuous basis until terminated. For example, a user may use gestures to indicate a plurality of objects in the image until the user indicates that the routine should end (e.g., all relevant objects are identified).

Further, the processor may receive instructions modifying or creating a selection area for a gesture. Moreover, in some embodiments, the processor may provide an interface that receives input from the user to correct gestures and learn additional gestures.

FIG. 5 illustrates an example environment 500 for implementing embodiments consistent with the present disclosure. Variations of environment 500 may be used for implementing processes of the present disclosure. As shown in FIG. 5, environment 500 generally includes user 510, device 520, and scene 530. User 510 may be a human user or a group of human users. User 510 may operate device 520, consistent with the present disclosure.

Device 520 may be used to implement or perform processes consistent with the present disclosure. Device 520 may be, for example, a smartphone, a wrist-worn computing device, a head-mounted computing device, a tablet, a laptop computer, or a desktop computer. Other computing devices may exist that meet the functional requirements of device 520 consistent with the present disclosure and may be used in accordance with the disclosed embodiments.

In some embodiments, device 520 includes one or more processor(s) 521. Processor 521 may perform processing functions, execute algorithms, or follow instructions. Processor 521 may be a single or multicore processor, a system-on-a-chip (SoC), or an application-specific integrated circuit (ASIC). Other computing processor types may be used in accordance with the disclosed embodiments.

Device 520 may also have memory 523. Memory 523 may store data and instructions. Memory 523 may send and receive data and instructions to processor 521. Memory 523 may be, for example, volatile or nonvolatile memory, such as RAM, ROM, flash memory, or a hard disk. Memory 523 may also be used to store captured images or video.

As shown in FIG. 5, device 520 may include display 525. Display 525 may allow the user to observe and interact with device 520. Display 525 may be, for example, an LCD, LED, OLED, or CRT display. Display 525 may include a plurality of displays.

Device 520 may include image input 527. Image input 527 may include an image capture unit, such as a digital camera. Image input 527 may be, for example, a digital camera using a charge-coupled device (CCD), complementary metal-oxide-semiconductor (CMOS), or N-type metal-oxide-semiconductor (NMOS) image sensor. Other image input mechanisms or image capture devices may be used to fulfill the objects of this disclosure. Memory 523 may receive and store data from image input 527. Image input 527 may capture images or video of scene 530.

Scene 530 may be an area or landscape and include various objects or people. The objects or people of scene 530 may be located at different locations and distances from computing device 520, which may place the objects in different focal planes.

Scene 530 may include foreground section 540. Foreground section 540 may be located close to computing device 520. For example, foreground section 540 may be the focal plane location inches to feet away from device 520 and image capture device 527.

Foreground section 540 may include gesture 545. For example, gesture 545 may comprise a hand gesture of user 510. In an example embodiment, user 510 may hold device 520 with one hand and use their other hand to perform gesture 545 in front of image capture device 527. In another embodiment, gesture 545 may be generated by a person that is not holding device 520. For example, user 510 may be holding device 520 and image input 527 to capture a friend who is providing gesture 545 in scene 530 farther away from device 520. In other embodiments gesture 545 may not be located in foreground section 540. For example, a friend of user 510 may be located farther away and provide a gesture outside of foreground section 540.

Scene 530 may also include background section 550. Background section 550 may be located farther away from image capture device 527 than foreground section 540. For example, foreground section 540 may be located yards or blocks away from image capture device 527. Thus, foreground section 540 and background section 550 may be in different focal planes.

Background section 550 may include object 555. Object 55 may be, for example, a document, an item, a building, a food, etc. Object 555 may be highlighted or addressed by gesture 545. For example, a user may point at or circle an item in scene 530.

The items of environment 500 may be rearranged depending on the characteristics of components and needs of the user. In some embodiments, background section may include a gesture and foreground section 540 may include an object. For example, device 520 may be fixed on a mount, such as a tripod, and user 510 may be in background section 550 making a gesture and using a remote to trigger image input 527 to capture an image. Other variations on the arrangement of environment 550 may be implemented, consistent with the present disclosure.

FIG. 6 illustrates an example system 600 for implementing embodiments consistent with the present disclosure. Variations of system 600 may be used for implementing components or devices of the disclosed embodiments. System 600 may be, for example, a desktop computer, a laptop computer, a tablet computer, a hybrid tablet-laptop, a smartphone, a wrist-held device, head-mounted device, a set-top box, or a television. It will be appreciated that the components and features represented in FIG. 6 may be duplicated, omitted, or modified.

As shown in FIG. 6, an example system 600 may include a central processing unit 601 (also referred to as an electronic processor or CPU) for managing and processing data, and performing operations, consistent with the present disclosure. (CPU 601 may be implemented as one or more processors.) System 600 may also include storage device 603. Storage device 603 may comprise optical, magnetic, signal, and/or any other type of storage device. System 600 may also include network adapter 605. Network adapter 605 may allow system 600 to connect to electronic networks, such as network 630, which may be the Internet, a local area network, a wide area network, a cellular network, a wireless network, or any other type of network or combination of networks. System 600 may also include power unit 607, which may enable system 600 and its components to receive power and operate fully.

As shown in FIG. 6, system 600 may also include input device 612, which may receive input from users and/or modules or devices. Such modules or devices may include, but are not limited to, keyboards, mice, trackballs, trackpads, scanners, cameras, and other devices which connect via Universal Serial Bus (USB), serial, parallel, infrared, wireless, wired, or other connections.

Input device 612 may capture and/or provide image input (images or video) to CPU 501. Image device 612 may include, for example, a digital camera using a charge-coupled device (CCD), complementary metal-oxide-semiconductor (CMOS), or N-type metal-oxide-semiconductor (NMOS) image sensor. Other image input devices may be used, consistent with the present disclosure.

System 600 also includes output device 614, which transmit data to users and/or modules or devices. Such modules or devices may include, but are not limited to, computer monitors, televisions, screens, projectors, printers, plotters, and other recording/displaying devices which connect via wired or wireless connections.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

It is to be understood that both the foregoing general description are exemplary and explanatory only, and are not restrictive. Further, the accompanying drawings, which are incorporated in and constitute a part of this specification, illustrate embodiments of the present disclosure and together with the description, and are similarly not restrictive.

What is claimed is:

1. A computer-implemented system comprising:
an image capture device that captures images;
a memory device that stores instructions; and
at least one processor that executes the instructions to perform operations comprising:
receiving, from the image capture device, at least one image including a gesture made by a user;
analyzing the at least one image to identify the gesture made by the user in the at least one image;
determining, based on the identified gesture, a first action to perform on the at least one image;
determining a selection area for the gesture;
identifying an area of interest in the at least one image based on the determined selection area of the gesture, wherein the area of interest includes non-textual content;
performing the first action on the identified area of interest, wherein the first action comprises:
classifying the non-textual content included in the area of interest into at least one of a plurality of different types of non-textual content into which the non-textual content is classifiable by the computer-implemented system, wherein the computer-implemented system is capable of recognizing each of a face, an object, and a landscape; and
generating a first result that indicates the at least one type of non-textual content into which the non-textual content included in the area of interest was classified;
determining a second action to be performed on the identified area of interest based at least in part on the at least one type of non-textual content into which the non-textual content included in the area of interest was classified; and
performing the second action on the identified area of interest.

2. The computer-implemented system according to claim 1, wherein the selection area for the gesture is determined by a shape and a location of the gesture in the at least one image.

3. The computer-implemented system according to claim 1, wherein:
determining the second action to be performed on the identified area of interest comprises determining, based on the gesture and the first result, the second action to be performed on the identified area of interest.

4. A non-transitory, computer-readable medium storing instructions, the instructions configured to cause at least one processor to perform operations comprising:
receiving at least one image including a gesture made by a user;
analyzing the at least one image to identify the gesture made by the user in the at least one image;
determining, based on the gesture, a first action to perform on the at least one image;
determining a selection area for the gesture;
identifying an area of interest in the at least one image based on the determined selection area of the gesture, wherein the area of interest includes non-textual content; and
performing the first action on the identified area of interest, wherein the first action comprises:
classifying the non-textual content included in the area of interest into at least one of a plurality of different types of non-textual content into which the non-textual content is classifiable by the at least one processor, wherein the instructions are configured to cause the at least one processor to be capable of recognizing each of a face, an object, and a landscape; and
generating a first result that indicates the type of non-textual content into which the content included in the area of interest was classified;
determining a second action to be performed on the identified area of interest based at least in part on the at least one type of non-textual content into which the non-textual content included in the area of interest was classified; and
performing the second action on the identified area of interest.

5. The computer-readable medium according to claim 4, wherein the selection area for the gesture is determined by a shape and a location of the gesture in the at least one image.

6. The computer-readable medium according to claim 4, wherein:
determining the second action comprises determining, based on the gesture and the first result, the second action to be performed on the identified area of interest.

7. A method comprising the following operations performed by one or more processors:
receiving at least one image including a single gesture made by a user;
analyzing the at least one image to identify the single gesture made by the user in the at least one image;
determining, based on the single gesture, a first action to perform on the at least one image;
determining a selection area indicated by the single gesture, such that both of the first action and the selection area are determined based on the single gesture made by the user in the at least one image;
identifying an area of interest in the at least one image based on the determined selection area indicated by the gesture; and
performing the first action on the identified area of interest, wherein performing the first action comprises recognizing, by the one or more processors that are capable of recognizing each of a face, an object, or a landscape, at least one of the face, the object, or the landscape within the area of interest.

8. The method according to claim 7, wherein the selection area for the single gesture is determined by a shape and a location of the single gesture in the at least one image.

9. The method according to claim 7, wherein the first action results in a first result and the method further comprises:
determining, based on the single gesture and the first result, a second action; and
performing the second action.

10. The computer-implemented system according to claim 1, wherein performing the second action comprises at least one of performing a facial recognition on a first face, identifying a first object, or determining a location.

11. The computer-implemented system according to claim 1, wherein:
classifying content included in the area of interest into at least one of the plurality of different types of content comprises classifying the content included in the area of interest as a first face; and
performing the second action comprises automatically performing facial recognition on the first face.

12. The computer-implemented system according to claim 1, wherein:
  determining the selection area for the gesture comprises determining the selection area based on a first image that includes the gesture made by the user; and
  identifying the area of interest in the at least one image comprises:
    obtaining a second image that depicts a same scene as the first image that includes the gesture made by the user, wherein the second image does not include the gesture made by the user; and
    identifying the area of interest in the second image based at least in part on the selection area determined from the first image.

13. The computer-implemented system according to claim 1, wherein analyzing the at least one image to identify the gesture made by the user in the at least one image comprises:
  obtaining depth of field measurements for the at least one image; and
  detecting the gesture in a foreground of the at least one image based at least in part on the depth of field measurements.

14. The computer-implemented system according to claim 1, wherein analyzing the at least one image to identify the gesture made by the user in the at least one image comprises:
  providing the at least one image to a deep neural network; and
  receiving an identifier for the gesture from the deep neural network.

15. The computer-implemented system according to claim 1, wherein analyzing the at least one image to identify the gesture made by the user in the at least one image comprises:
  providing the at least one image to a deep neural network; and
  receiving an output from the deep neural network that identifies one or more regions of the at least one image that contain the gesture.

16. The computer-implemented system according to claim 1, wherein analyzing the at least one image to identify the gesture made by the user in the at least one image comprises:
  providing the at least one image to a long short term memory neural network; and
  receiving an identifier for the gesture from the long short term memory neural network.

17. The computer-implemented system according to claim 1, wherein determining the selection area for the gesture comprises:
  obtaining depth data associated with the at least one image; and
  translating one or more boundaries in the at least one image into real world coordinates based at least in part on the depth data associated with the at least one image.

18. The computer-implemented system according to claim 1, wherein:
  analyzing the at least one image to identify the gesture comprises analyzing the at least one image to identify an O-shaped gesture formed by at least one finger and a thumb; and
  determining the selection area for the gesture comprises determining a center and a radius of a circular selection area based at least in part on the O-shaped gesture.

19. The computer-implemented system according to claim 1, wherein:
  performing the second action on the identified area of interest comprises:
    when the non-textual content included in the area of interest has been classified as a first face, performing facial recognition to determine an identity associated with the first face;
    when the non-textual content included in the area of interest has been classified as a first object, identifying the first object;
    when the non-textual content included in the area of interest has been classified as a first landscape, determining a location associated with the first landscape.

20. The computer-implemented system according to claim 1, wherein:
  classifying content included in the area of interest into at least one of the plurality of different types of content comprises classifying the content included in the area of interest as a first face; and
  performing the second action comprises identifying any contacts of a user that correspond to the first face.

* * * * *